United States Patent [19]

Patriquin

[11] Patent Number: 4,736,873

[45] Date of Patent: Apr. 12, 1988

[54] SELF POWERED LIQUOR METERING PUMP

[75] Inventor: Lawrence J. Patriquin, Los Angeles, Calif.

[73] Assignee: Bar-Master International, Los Angeles, Calif.

[21] Appl. No.: 1,870

[22] Filed: Jan. 9, 1987

[51] Int. Cl.$^4$ ............................................. G01F 11/04
[52] U.S. Cl. ................................... 222/249; 222/335; 222/129.2; 137/625.6
[58] Field of Search ............... 222/249, 250, 335, 133, 222/129.2, 129.1, 372; 137/625.48, 625.6; 417/392

[56] References Cited

U.S. PATENT DOCUMENTS

| | | | |
|---|---|---|---|
| 2,538,111 | 1/1951 | Luster | 222/129.2 |
| 3,216,627 | 11/1965 | Best et al. | 222/249 |
| 3,283,957 | 11/1966 | Henderson | 222/249 X |
| 3,565,287 | 2/1971 | Johnston | 222/249 X |
| 3,863,810 | 2/1975 | Hanson | 222/129.1 |
| 4,095,628 | 6/1978 | Laub, III | 222/249 X |
| 4,234,015 | 11/1980 | Kintner | 137/625.48 X |
| 4,354,527 | 10/1982 | McMillan | 137/625.6 X |
| 4,547,134 | 10/1985 | Hirvonen | 417/392 X |
| 4,619,378 | 10/1986 | de Man | 222/129.2 X |

OTHER PUBLICATIONS

Electronic Dispenser Inc., drawings on liquor dispensing systems, sheets 42, 53, 55, 86, 90, 145, 185, 187, 188 and 191.

Primary Examiner—Joseph J. Rolla
Assistant Examiner—Nils E. Pedersen
Attorney, Agent, or Firm—Harris, Kern, Wallen & Tinsley

[57] ABSTRACT

An apparatus for dispensing measured amounts of liquor from a liquor source under pressure. The apparatus includes a hand held nozzle with a thumb operated plunger valve and with the nozzle connected to the liquor source and a source of gas under pressure via a control valve and a liquor storage cylinder. Manual actuation of the dispenser valve on the nozzle controls the control valve which in turn actuates the storage cylinder to dispense the metered amount of liquor, with the storage cylinder being powered by the liquor source and with the control valve being powered by the gas source.

6 Claims, 2 Drawing Sheets

SELF POWERED LIQUOR METERING PUMP

BACKGROUND OF THE INVENTION

This invention relates to beverage dispensing systems of the general type shown in U.S. Pat. No. 3,863,810. In this type of dispensing apparatus, a hand held nozzle is connected to a beverage source by a hose, and beverage dispensing is controlled by one or more push button type plungers mounted in the hand held nozzle. This type of dispensing apparatus allows the person who is dispensing beverages the freedom of filling individual glasses by a simple push button actuation after positioning the nozzle at the desired glass. This is in contrast to the use of separate containers which have to be individually lifted and replaced, and the use of a set of fixed nozzles which require positioning of the glass at the nozzle prior to nozzle actuation.

In the past, the hand held dispensing nozzle has been utilized for dispensing carbonated soft drinks and the like where the amount of beverage to be dispensed is determined by the size of the container being filled. In another application of the hand held dispensing apparatus, the user desires to dispense a measured amount of the beverage, typically a predetermined number of fluid ounces of a wine or alcoholic beverage.

Metering pumps have been utilized in the past for metering liquids and an electrically powered metering pump has been used for dispensing measured amounts of beverage. However the electric powered pump requires an external source of power for control and operation, making the dispensing apparatus more complicated and more difficult to maintain, as well as having electric power adjacent a hand held liquid system, a situation which always raises safety concerns.

It is an object of the present invention to provide a new and improved apparatus for dispensing measured amounts of liquid which does not require any electrical power source and which is self powered from the liquid being dispensed. These and other objects, advantages, features and results will more fully appear in the course of the following description.

SUMMARY OF THE INVENTION

An apparatus for dispensing measured amounts of liquor from a liquor source under pressure thereby providing a self-powered dispensing apparatus. A liquor storage cylinder with a piston sliding therein between first and second inlets, a five port control valve with two ports for connecting to a liquor source under pressure, two ports for connecting to the storage cylinder, and one port for connecting to a nozzle having a dispenser valve which controls gas flow between a gas inlet and a gas vent. Means are provided for connecting a source of gas under pressure to the control valve and to the nozzle, with the gas source providing a relatively high gas pressure to the control valve when the vent in the nozzle is closed, and a relatively low gas pressure to the control valve when the nozzle vent is opened by the nozzle dispenser valve. The operation of the control valve provides for motion of the piston in the cylinder driven by the liquor under pressure to pump liquor from the cylinder under the control of the nozzle dispenser valve, with the quantity of liquor being determined by the size of the cylinder and the piston travel.

DESCRIPTION OF THE PREFERRED EMBODIMENT

Figure 1:
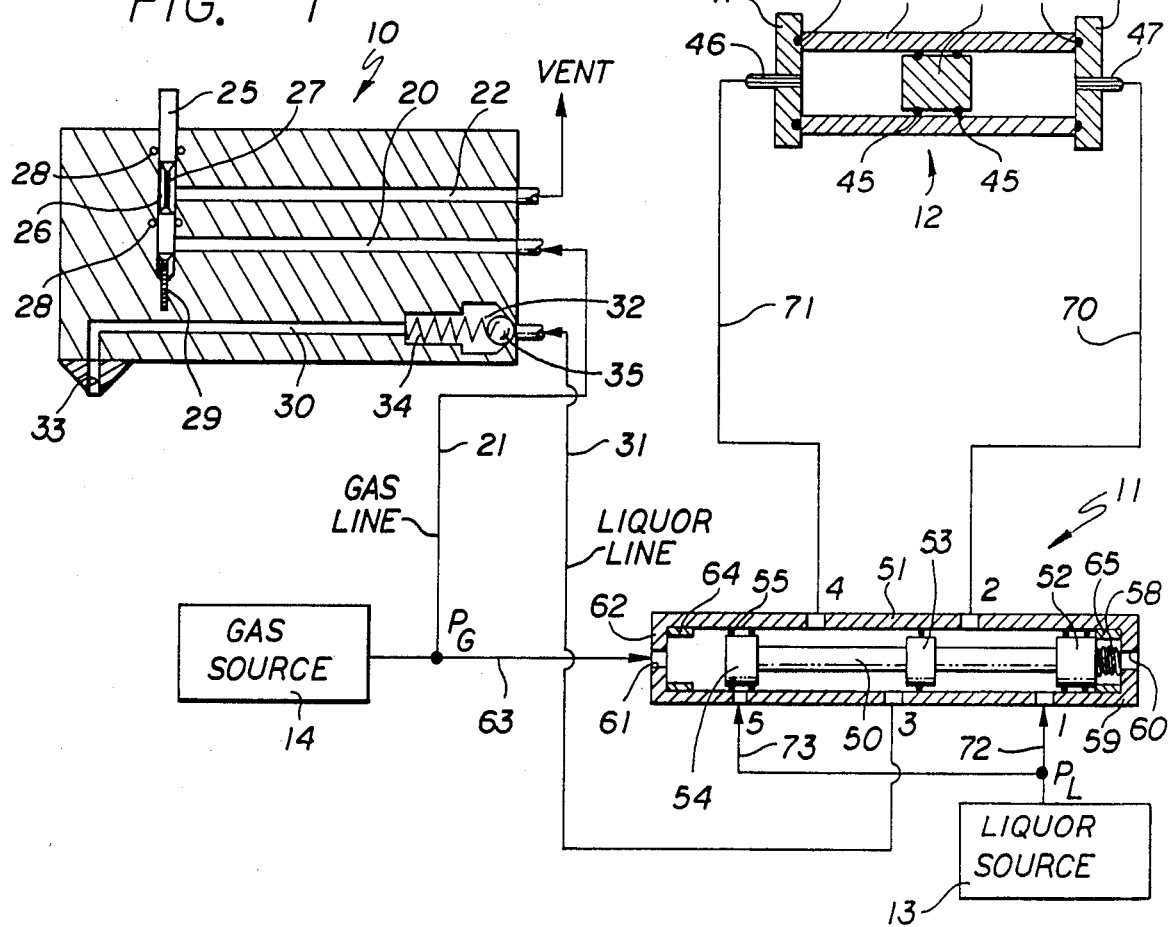
FIG. 1 is a view showing the components of a dispensing apparatus in section, with the components interconnected by flow lines, and incorporating the presently preferred embodiment of the invention.

The dispensing apparatus includes a nozzle 10, a control valve 11, and a storage cylinder 12. The nozzle typically is hand held and is connected to the other components by a plurality of lines in a flexible hose structure which may be conventional. The control valve and the storage cylinder typically are mounted on or under a deck or countertop or the like, and include provision for connection to a source 13 of liquor under pressure and a source 14 of gas under pressure.

The nozzle 10 includes a gas inlet passage 20 connected to the gas source 14 by a line 21, and a vent passage 22 which is open to the ambient atmosphere. A dispenser valve is incorporated in the nozzle for controlling flow from the gas line to the vent. A plunger 25 is slidably mounted in an opening 26, with the plunger having a reduced section 27. O-ring seals 28 are provided in the opening 26, and the plunger is urged to the upward position of FIG. 1 by a spring 29 in the bottom of the opening 26.

With the plunger 25 in the position shown in FIG. 1, the flow path between the gas line 21 and the atmosphere is blocked. When the plunger is depressed by thumb action or the like, the spring 29 is compressd and a gas flow path is established from the gas line 21 through the inlet passage 20 into the opening 26 at the reduced section 27, and to the atmosphere through the vent passage 22.

A liquor flow passage 30 is also provided in the nozzle 10, providing a flow path from a liquor line 31, through a check valve 32, to a nozzle liquor outlet 33. The check valve 32 may be conventional in design and includes a spring 34 and a ball 35, for permitting flow from the liquor line 31 to the liquor outlet 33. The check valve is not essential to the invention, but does function to prevent backflow from the nozzle outlet to the liquor line.

The storage cylinder 12 has a cylindrical body 40 with closed ends 41, 42 and seals 43. A piston 44 slides within the body 40 and has seals 45. An inlet 46 is provided in the end 41, and another inlet 47 is provided in the end 42.

The control valve 11 has a spindle 50 sliding in a sleeve 51, with the spindle having three lands 52, 53, 54, with one or more seals 55 on each land. There are five ports in the sleeve 51 identified as 1, 2, 3, 4 and 5.

Means are provided for moving the spindle in the sleeve, and in the embodiment illustrated, a spring 58 is positioned between an end 59 of the sleeve 51 and the spindle 50, with an opening 60 serving as a vent. The gas source 14 is connected to an opening 61 in the opposite end 62 of the sleeve by a line 63. Annular stops 64, 65 are positioned within the sleeve at each end for limiting spindle movement.

The control valve port 2 is connected to the cylinder inlet 47 by a line 70 and the port 4 is connected to the inlet 46 by another line 71. The liquor source 13 is connected to port 1 by a line 72 and to port 5 by a line 73. The port 3 is connected to the passage 30 in the nozzle 5 by the line 31.

Figure 2:
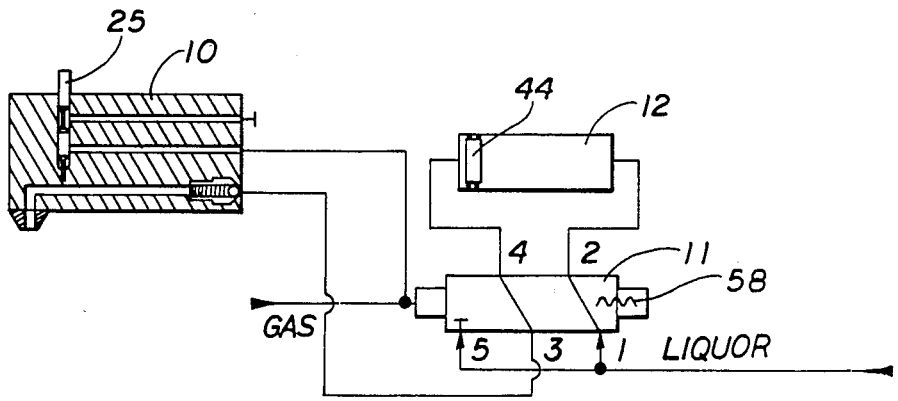
FIGS. 2, 3 and 4 are diagramatic views of the apparatus of FIG. 1 illustrating the operation of the apparatus, with FIG. 2 showing the apparatus at rest, FIG. 3 showing the apparatus during the first half of a dispensing cycle, and FIG. 4 showing apparatus during the second half of the dispensing cycle.
Figure 3:
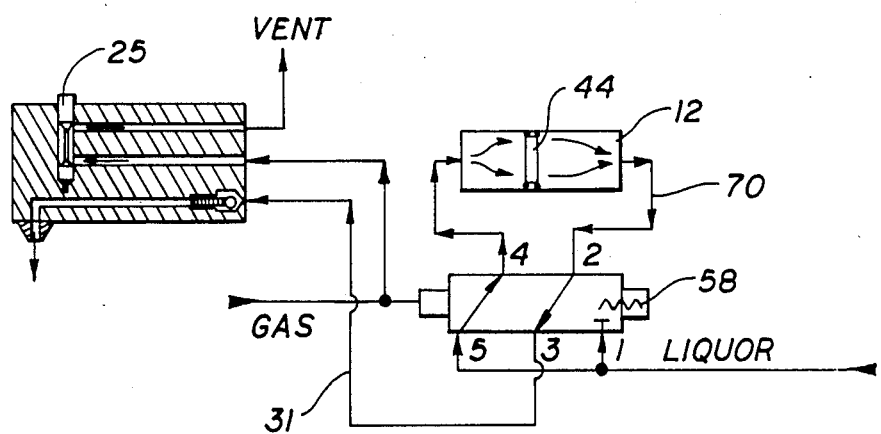
Figure 4:
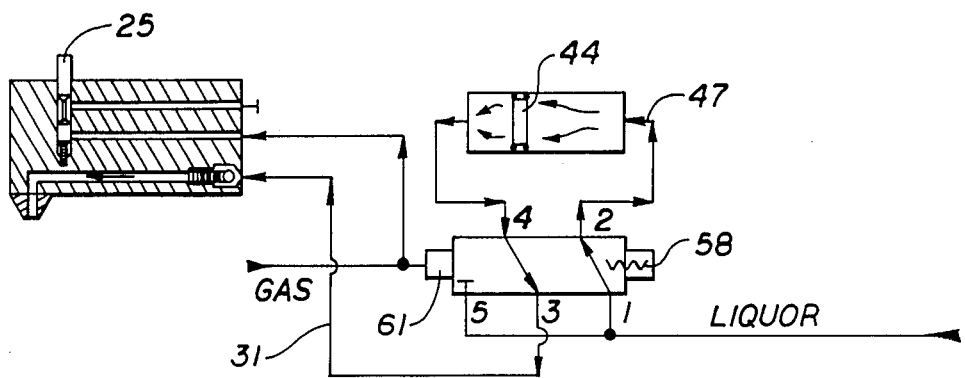

The operation of the dispensing apparatus is shown in FIGS. 2, 3 and 4. The apparatus is in the normal or rest condition in FIG. 2, with the nozzle plunger 25 in the UP position closing the vent at the nozzle. The pressure from the gas source at the left end of the control valve is sufficient to compress the control valve spring 58 and move the spindle to the right, providing a flow path in the control valve between ports 1 and 2 and between ports 3 and 4, with port 5 blocked. The pressure of the liquor source 13 causes liquor flow from port 1 through port 2 and storage cylinder inlet 47, into the storage cylinder moving the piston 44 to the left. In one preferred configuration, the pressure at the liquor source is about 20 psig and the pressure of the gas source is about 40 psig. Present day bars usually have sources of air, carbon dioxide and/or nitrogen available, and one of these can be used with the dispensing apparatus of the invention.

When a measured amount of liquor is to be dispensed, the plunger 25 is depressed, as shown in FIG. 3, providing a flow path from the gas source into the passage 20, around the plunger and out the passage 22, to the vent. Under this condition, the gas pressure at the inlet to the control valve is reduced, typically from about 20 psig to about 7 psig. With this change in gas pressure at the control valve, the force exerted by the spring 58 is sufficient to overcome the gas pressure and move the spindle to the left, closing port 1 and providing a flow path between ports 2 and 3 and a flow path between ports 4 and 5. The liquor under pressure now flows from the source 13 through the ports 5 and 4 and into the left end of the cylinder through inlet 46. This moves the piston to the right and forces the contents of the cylinder out through line 70 and ports 2 and 3 to line 31, past the check valve and out the outlet 33. When this discharge has been completed, the plunger 25 is released and is moved upward by the spring 29 to the position of FIG. 4, again closing the vent. The higher gas pressure from the gas source is again established at the inlet opening 61 of the control valve, compressing the spring 58 and moving the spindle to the right. The liquor under pressure now flows through ports 1 and 2 and cylinder inlet 47 to move the piston 44 to the left and again empty the chamber, this time through ports 4 and 3 to line 31. When the piston 44 has moved fully to the left, the dispensing cycle is completed and the apparatus is again in the rest position of FIG. 2.

Thus it is seen that a measured amount of liquor has been dispensed by the single actuation of the plunger of the nozzle dispenser valve. The quantity dispensed comprises two times the volume of the storage cylinder, and it is readily understood that the cylinder volume can be adjusted by various conventional means. The entire dispensing operation is accomplished utilizing the pressure of the stored liquor source and the pressure of the gas source without requiring any electrical or mechanical power and with only a single manual operation, typically the serving person's thumb action at the hand held nozzle.

I claim:

1. In an apparatus for dispensing measured amounts of liquor from a liquor source under pressure, the combination of:
    a liquor storage cylinder having first and second inlets adjacent opposite ends of said cylinder, and a piston positioned within said cylinder for sliding between said inlets;
    a control valve having a spindle moving within a housing between first and second positions, said valve having five ports, with the first and second ports interconnected, the third and fourth ports interconnected, and the fifth port blocked when said spindle is in said first position, and with said first port blocked, said second and third ports interconnected, and said fourth and fifth ports interconnected when said spindle is in said second position,
    said control valve having means for moving said spindle between said first and second positions;
    nozzle means having a dispenser valve with a plunger moving between first and second positions, and having a gas inlet and a gas vent,
    with said dispenser valve providing a gas flow path between said gas inlet and vent, with said gas flow path blocked when said dispenser valve is in said first position and with said gas flow path open when said dispenser valve is in said second position; and
    flow means for connecting a liquor source under pressure to said first and fifth ports of said control valve, a gas source under pressure to said control valve moving means and to said nozzle means gas inlet, and said second and fourth ports to said cylinder first and second inlets, respectively;
    with said nozzle means including a liquor inlet and a liquor outlet with a check valve in line therebetween, and with said flow means including means for connecting said third port to said liquor inlet.

2. A dispensing apparatus as defined in claim 1 wherein said means for moving said control valve spindle includes spring means for moving said spindle to said second position and an actuator inlet for moving said spindle to said first position.

3. A dispensing apparatus as defined in claim 1 wherein said means for moving said control valve spindle includes spring means for moving said spindle to said second position and a gas pressure inlet for connecting to said gas source for moving said spindle to said first position.

4. A dispensing apparatus as defined in claim 1 wherein said nozzle means has a top, a bottom, and a side between said top and bottom, with said gas and liquor inlets at said side, said liquor outlet at said bottom and said plunger projecting upward from said top.

5. A dispensing apparatus as defined in claim 4 including a spring in said nozzle means for urging said plunger to said first position.

6. In an apparatus for dispensing measured amounts of liquor from a liquor source under pressure, the combination of:
    a liquor storage cylinder having first and second inlets adjacent opposite ends of said cylinder, and a piston positioned within said cylinder for sliding between said inlets;
    a control valve having a spindle moving within a housing between first and second positions, said valve having five ports, with the first and second ports interconnected, the third and fourth ports interconnected, and the fifth port blocked when said spindle is in said first position, and with said first port blocked, said second and third ports interconnected, and said fourth and fifth ports interconnected when said spindle is in said second position, said control valve having means for moving said control valve spindle including spring means for moving said spindle to said second position and a gas pressure inlet for connecting to said gas source for moving said spindle to said first position;

a nozzle having a dispenser valve with a plunger moving between first and second positions, and having a gas inlet and a gas vent and a liquor inlet and a liquor outlet with a check valve in line therebetween, with said nozzle having a top, a bottom, and a side between said top and bottom, with said gas and liquor inlets at said side, said liquor outlet at said bottom and said plunger projecting upward from said top, and including a spring in said nozzle for urging said plunger to said first position, and with said dispenser valve providing a gas flow path between said gas inlet and vent, with said gas flow path blocked when said dispenser valve is in said first position and with said gas flow path open when said dispenser valve is in said second position; and flow means for connecting a liquor source under pressure to said first and fifth ports of said control valve, a gas source under pressure to said control valve moving means and to said nozzle gas inlet, said second and fourth ports to said cylinder first and second inlets, respectively, and said third port to said liquor inlet.

* * * * *